No. 788,035. PATENTED APR. 25, 1905.
A. R. FERGUSSON.
JOINT.
APPLICATION FILED MAR. 25, 1904.

Witnesses:
Inventor:
Alan R. Fergusson,
By his attorney,
F. H. Richards.

No. 788,035.                                                                                                    Patented April 25, 1905.

UNITED STATES PATENT OFFICE.

ALAN R. FERGUSSON, OF NEW YORK, N. Y.

JOINT.

SPECIFICATION forming part of Letters Patent No. 788,035, dated April 25, 1905.

Application filed March 25, 1904. Serial No. 200,003.

*To all whom it may concern:*

Be it known that I, ALAN R. FERGUSSON, a citizen of the United States, residing in New York, Manhattan borough, in the county of New York and State of New York, have invented certain new and useful Improvements in Joints, of which the following is a specification.

This invention relates to means for articulating one member to another in a manner such that one of the members may be adjusted relatively to the other and securely held in the relative position it has been caused to assume by reason of the adjustment.

The invention is capable of application to a wide variety of uses under conditions where it is desirable that one member should be susceptible of a movement in the nature of a universal movement relatively to another.

The present invention embodies a joint construction permitting relative movement in a plurality of planes, in either one of which an adjusting movement of one of the members relatively to the other may be made—that is to say, a joint in which the movement given to the member is the resultant of possible movements in different planes—being compounded from the possible separate or individual movements.

A particular feature of the present joint relates to clamping means for securely holding the parts in their adjusted position even though there is a tendency of no inconsiderable moment to alter their relationship.

In a general way the present joint construction may be said to include a convex part fitting into a concave part or socket, means in the nature of a clamping bolt or screw intersecting the frictional contact-surfaces and serving to hold the two parts together frictionally tight. While this clamping-bolt defines one of the axes about which the parts may be relatively adjusted, it does not, however, constitute the only axis of adjustment, since at least one of the connecting parts is so formed as to permit the movement of the said part in a manner such that an adjustment may be made about an axis extending at an angle to the axis of the clamping-bolt.

Figure 6:
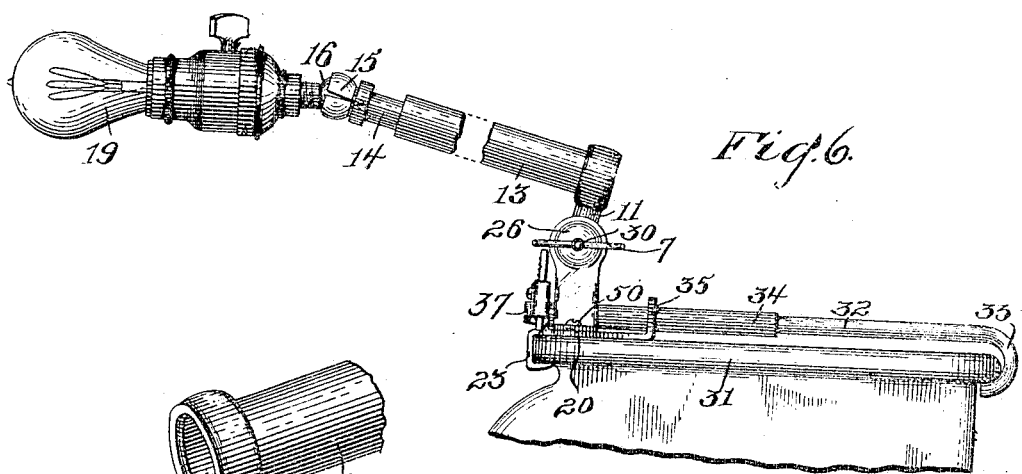
Figure 5:
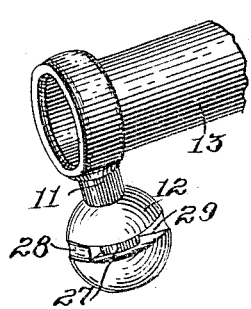
Figure 4:
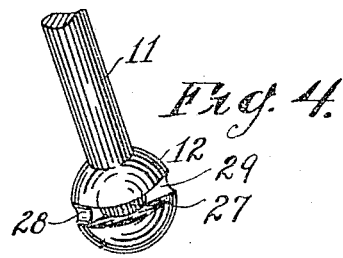
Figure 1:
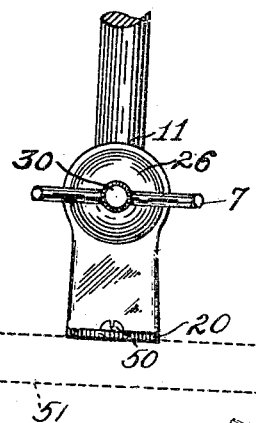
Figure 2:
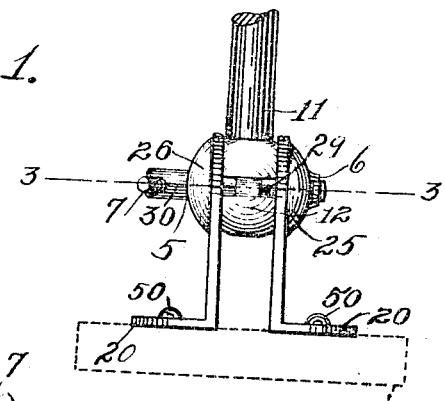
Figure 3:
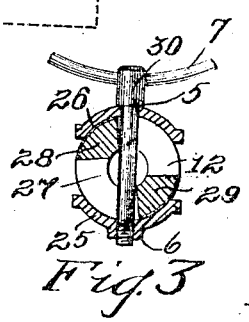

In the drawings accompanying the present specification, Figure 1 is an elevational view of a joint embodying my present improvement. Fig. 2 is an elevational view looking from the right in Fig. 1. Fig. 3 is a cross-sectional view on the plane of the line 3 3 in Fig. 2. Fig. 4 is a perspective view of one of the parts of the joint, such part being removed from its assembled position. Fig. 5 is a view similar to Fig. 4, but illustrates the stem indicated in said figure as provided with a transversely-extending arm. Fig. 6 is an elevational view of an application of the present invention to use as a desk-clamp, the joint being interposed between the clamp secured to the desk and the adjustable lamp-arm mounted on the clamp.

Similar characters of reference designate corresponding parts in all figures.

The present joint, as already stated, comprises in its construction a convex part and a concave part or socket in which the former fits, the two being held in firm frictional engagement by a pressure applied directly to one of the parts and resisted by the reaction of the other part. For the purpose of adjusting the frictional resistance to movement this pressure is preferably an adjustable one, and as a convenient means for forcing the two frictionally resistant surfaces against each other with a pressure adequate to support the parts in their adjusted position I may conveniently use a clamping-bolt which intersects the friction-surfaces and passes through the concave socket at the base or bottom thereof. This clamping-bolt then constitutes a device for clamping the parts together, and it when located as specified determines an axis about which the parts may be adjusted with relation to each other. So far as possible movement about this axis is concerned it is obvious that the friction-surfaces might be planes, but by making them approximately to portions of spheres I am enabled by cutting away one of the parts for the passage of the bolt during the relative adjustment to obtain a relative movement about another or other axes. Specifically, I form one of the parts with an equatorial slot, thus enabling the adjustment to be made about either the axis of the clamping-bolt, which runs diametrally with reference to the spherical surfaces, or about an axis at right angles thereto, or the adjusting movement may of course be one compounded from movements about these two axes.

While a joint embodying but one concave socket and a convex part, one of these parts being slotted in the manner aforesaid, embodies the features of the present invention, in the preferred construction I utilize a pair of opposed concave sockets, which not only serves to increase the frictional surface of contact between the relatively movable parts, but also forms a symmetrical device and enables the pressure exerted by one of the sockets against the spherical member to be resisted by the opposing pressure of the other socket. The clamping-bolt in such construction therefore conveniently passes from one socket-forming part through the convex member to the other socket-forming part, conveniently engaging by a screw-thread with one and having a resistant shoulder abutting against the other.

Such being the construction and there being provided a pair of opposed socket-forming parts the convex part of the joint may conveniently be in the form of a ball or sphere having a diametral opening through which the clamping-bolt passes and which opening is elongated equatorially to permit a relative turning about an axis perpendicular to the plane of the equatorial slot—that is, perpendicular to the axis of the clamping-bolt.

Referring in detail to the illustrated construction, 25 26 are the concave socket-forming members, from one to the other of which and through the interposed convex member or ball 12 passes a clamping-bolt 30, this latter being provided with a shoulder 5, which reacts against the exterior surface of one of the socket members and also having a threaded stem which engages with a corresponding thread in the other, this thread being continued in an extending boss 6. This clamping-bolt is provided with a thumb-piece, such as 7, for facilitating the adjustment of the bolt.

Equatorially of the ball 12 extends a slot, such as 27, which permits such a relative movement of the parts as carries the clamping-bolt angularly through this slot, corresponding to a turning movement about an axis perpendicular to the plane of the slot, and therefore to the axis of the clamping-bolt. This slot is of sufficient extent to permit an ample movement in this direction, the two parts of the ball, however, being joined by connecting portions 28 29 of ample proportions.

It is obvious that in so far as the application of the joint is concerned to any particular purpose with the object of rendering any two devices or members relatively adjustable it is immaterial to which part of member the socket-forming or concave parts of the joint are secured or to which part or member the ball of the joint is attached. Ordinarily, however, where adjustment is to be made relatively to a base the concave or socket-forming parts of the joint are secured thereto, and for this purpose they are in this instance provided with laterally-extending wings or flanges 20, perforated for screws 50, which may be secured to the base, of whatever nature the latter may be. In Figs. 1 and 2 a base is represented in a conventional way by dotted outline. (See the part 51.)

For conveniently mounting the other device or member upon the joint the ball 12 of the latter may be provided with a stem 11, which in this instance is disposed substantially perpendicular to the plane of the slot in the ball, thus enabling a turning movement of the ball to be had relatively to the socket-forming parts about an axis perpendicular to the plane of the slot and an adjusting movement of such stem to be had in a plane that carries the stem through the space between the socket-forming parts of the joint.

While the stem 11 may be utilized in any desired manner for mounting thereon the device or member connected with it, an application of the joint may conveniently be made by utilizing an arm 13, extending transversely to the stem 11, the arm constituting a convenient means for obtaining an adjusting movement about the axis of the stem and it being obviously also capable of a movement about the axis of the clamping bolt or screw— that is to say, of an adjustment compounded from these two separate or component movements.

As an instance of a particular application of the present joint may be cited that of an adjustable device for adjustably mounting a lamp upon a desk-top 31. Such an application is indicated in Fig. 6, in which a lamp 19 is secured by a ball-and-socket joint 15 16 to an arm 14. This latter is telescoping in the arm 13, mounted upon a desk-clamp through an interposed joint of the foregoing construction. This clamp in a general way comprises a rod 32, having a hook 33 and telescoping within a tube 34 and adjustable longitudinally therein by a screw 37 to rigidly affix the base 35 by means of an adjustable clamp 23 to the desk-top.

It is obvious that by running the clamping-bolts through the sides of the socket a powerful pressure may be obtained between the frictional surfaces, (for the purpose of increasing which the radius of sphericity of the concave socket-forming parts may be somewhat less than that of the ball,) and that by cutting away the ball in the manner aforesaid a wider range of adjusting movement may be obtained as compared with a construction in which the movement is confined to a plane transverse to the axis of the clamping-bolt.

The ball of this joint is provided with a slot, whose walls are so located that the maximum swing of the ball around the clamping-bolt in a plane parallel with the axis of the bolt will be such that the ball may in such plane assume positions substantially at right angles to each other.

Having thus described my invention, I claim—

1. The combination of a base, an arm and a joint interposed between the two, said joint embodying a pair of opposed concave socket-forming parts carried by said base, a ball from which the arm extends, and a diametral clamping member having a portion engaging with one portion of the socket and a threaded engagement with another portion of the socket and passing through the ball, said ball having an equatorial slot for the passage of the member during adjustment.

2. The combination of a base, an arm and a joint interposed between the two, the joint embodying a pair of opposed concave socket-forming parts extending from the base, a ball from which the arm extends, and a diametral clamping-bolt having a shoulder engaging with one of the socket-forming parts and a threaded engagement with the other socket-forming part and passing through the ball, said ball having an equatorial slot for the passage of the bolt during adjustment.

3. The combination of a base part, an arm part, and a joint interposed between the two, said joint comprising a pair of opposed concave socket-forming members carried by one of said parts, a ball from which the other of said parts extends and a diametral clamping-bolt passing through the ball and having a portion engaging one of the socket members and carrying threaded means engaging the other socket member, said ball having an equatorial slot for the bolt during adjustment.

Signed at Nos. 9 to 15 Murray street, New York, N. Y., this 21st day of March, 1904.

ALAN R. FERGUSSON.

Witnesses:
JOHN O. SEIFERT,
FRED. J. DOLE.